United States Patent
Kanoh et al.

(10) Patent No.: US 12,060,073 B2
(45) Date of Patent: Aug. 13, 2024

(54) CONTROL SYSTEM FOR VEHICLE AND CONTROL METHOD FOR VEHICLE

(71) Applicant: HONDA MOTOR CO., LTD., Tokyo (JP)

(72) Inventors: Tadahiko Kanoh, Wako (JP); Ayumu Horiba, Wako (JP); Katsuya Yashiro, Wako (JP); Chihiro Oguro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/383,859

(22) Filed: Oct. 25, 2023

(65) Prior Publication Data
US 2024/0051567 A1    Feb. 15, 2024

Related U.S. Application Data

(63) Continuation of application No. 17/562,379, filed on Dec. 27, 2021, now Pat. No. 11,858,527, which is a
(Continued)

(51) Int. Cl.
*B60W 50/16* (2020.01)
*B60W 30/14* (2006.01)
(Continued)

(52) U.S. Cl.
CPC .......... *B60W 50/16* (2013.01); *B60W 30/143* (2013.01); *B60W 40/072* (2013.01);
(Continued)

(58) Field of Classification Search
CPC ............ B60W 50/16; B60W 60/0057; B60W 60/0053; B60W 30/143; B60W 40/072;
(Continued)

(56) References Cited

U.S. PATENT DOCUMENTS 4,304,150 A    12/1981    Lupo et al.
8,606,455 B2    12/2013    Boehringer et al.
(Continued)

FOREIGN PATENT DOCUMENTS

EP    3756929 A1 *    12/2020    ............ B60K 37/06
JP    2017165289 A    9/2017
(Continued)

OTHER PUBLICATIONS

Japanese Office Action for Japanese Patent Application No. 2023003240 mailed Oct. 30, 2023.
(Continued)

*Primary Examiner* — Chico A Foxx
(74) *Attorney, Agent, or Firm* — Thomas | Horstemeyer, LLP

(57) ABSTRACT

A control system for a vehicle capable of traveling in first and second traveling states is provided. The second traveling state requires an operation related to traveling by a passenger more than the first traveling state. The system changes, based on a traveling situation of the vehicle, an upper limit speed at which the vehicle can travel in the first traveling state. The system performs notification to the passenger of a request for a predetermined operation at a timing when a traveling speed of the vehicle reaches a predetermined speed when switching from the first traveling state to the second traveling state. A difference between the upper limit speed and the predetermined speed is increased in a case where the upper limit speed is high compared to a case where the upper limit speed is low.

11 Claims, 4 Drawing Sheets

| UPPER LIMIT SPEED | ELAPSED TIME | VEHICLE SPEED AT WHICH STARTING TO TAKE OVER DRIVING | DIFFERENCE | NOTIFICATION INTENSITY |
|---|---|---|---|---|
| 80kph | 30 MINUTES OR MORE | 65kph | -15kph | STRONG |
|  | LESS THAN 30 MINUTES | 70kph | -10kph | MEDIUM |

Related U.S. Application Data continuation of application No. PCT/JP2019/026827, filed on Jul. 5, 2019.

(51) Int. Cl.
| | | |
|---|---|---|
| *B60W 40/072* | (2012.01) | |
| *B60W 40/105* | (2012.01) | |
| *B60W 50/08* | (2020.01) | |
| *B60W 60/00* | (2020.01) | |
| B60W 50/00 | (2006.01) | |
| B60W 50/14 | (2020.01) | |

(52) U.S. Cl.
CPC ........ *B60W 40/105* (2013.01); *B60W 50/082* (2013.01); *B60W 60/0053* (2020.02); *B60W 60/0057* (2020.02); *B60W 2050/0054* (2013.01); *B60W 2050/143* (2013.01); *B60W 2050/146* (2013.01); *B60W 2552/30* (2020.02); *B60W 2555/60* (2020.02)

(58) Field of Classification Search
CPC ............. B60W 40/105; B60W 50/082; B60W 2552/30; B60W 2555/60; B60W 2050/0054; B60W 2050/143; B60W 2050/146

See application file for complete search history.

(56) References Cited

U.S. PATENT DOCUMENTS

| | | | |
|---|---|---|---|
| 9,606,536 B2 | 3/2017 | Sato et al. | |
| 9,910,435 B2 | 3/2018 | Sato et al. | |
| 10,228,698 B2 | 3/2019 | Mimura et al. | |
| 10,427,686 B2 | 10/2019 | Mimura et al. | |
| 10,449,970 B2 | 10/2019 | Urano et al. | |
| 10,643,474 B2* | 5/2020 | Yamada | G06V 20/56 |
| 10,684,620 B2 | 6/2020 | Park et al. | |
| 10,768,617 B2 | 9/2020 | Igarashi et al. | |
| 10,967,877 B2 | 4/2021 | Asakura et al. | |
| 11,084,497 B2 | 8/2021 | Ibuka et al. | |
| 11,267,484 B2 | 3/2022 | Mimura et al. | |
| 11,332,164 B2 | 5/2022 | Kaji et al. | |
| 11,511,743 B2 | 11/2022 | Kowalchuk et al. | |
| 11,745,656 B2 | 9/2023 | Chen et al. | |
| 2010/0179737 A1* | 7/2010 | Eriksson | F16H 61/0213 477/111 |
| 2012/0078477 A1* | 3/2012 | Takashiro | F16H 59/08 701/52 |
| 2012/0277947 A1 | 11/2012 | Boehringer et al. | |
| 2016/0041553 A1 | 2/2016 | Sato et al. | |
| 2017/0075349 A1 | 3/2017 | Sato et al. | |
| 2017/0261984 A1* | 9/2017 | Ichikawa | B60W 50/14 |
| 2017/0267238 A1* | 9/2017 | Mimura | B60W 50/082 |
| 2017/0315556 A1 | 11/2017 | Mimura et al. | |
| 2017/0334454 A1* | 11/2017 | Abe | B60W 50/0098 |
| 2017/0364070 A1* | 12/2017 | Oba | B60W 60/0059 |
| 2018/0105184 A1* | 4/2018 | Urano | B60K 31/0008 |
| 2018/0329414 A1 | 11/2018 | Garashi et al. | |
| 2019/0011914 A1 | 1/2019 | Park et al. | |
| 2019/0064826 A1* | 2/2019 | Matsui | G01C 21/3484 |
| 2019/0106118 A1 | 4/2019 | Asakura et al. | |
| 2020/0079395 A1 | 3/2020 | Ibuka et al. | |
| 2020/0098203 A1* | 3/2020 | Uno | G08G 1/0112 |
| 2020/0150653 A1* | 5/2020 | Goldman | G05D 1/2279 |
| 2020/0208736 A1* | 7/2020 | Fujii | B60K 23/00 |
| 2020/0231182 A1* | 7/2020 | Oba | G05D 1/0061 |
| 2020/0256460 A1* | 8/2020 | Naito | B60W 30/19 |
| 2020/0298876 A1 | 9/2020 | Mimura et al. | |
| 2021/0048815 A1* | 2/2021 | McErlean | B60W 50/14 |
| 2021/0101621 A1* | 4/2021 | Ide | B62D 15/025 |
| 2021/0146962 A1 | 5/2021 | Kaji et al. | |
| 2021/0179103 A1 | 6/2021 | Kowalchuk et al. | |
| 2021/0286357 A1* | 9/2021 | Oba | B60W 50/08 |
| 2021/0370982 A1 | 12/2021 | Kasahara et al. | |
| 2022/0032904 A1 | 2/2022 | Lee et al. | |
| 2022/0119000 A1 | 4/2022 | Kanoh et al. | |
| 2022/0194432 A1* | 6/2022 | Ide | B60W 60/0053 |
| 2022/0371611 A1* | 11/2022 | Yamanouchi | B60Q 1/543 |
| 2022/0402490 A1 | 12/2022 | Liu et al. | |
| 2023/0042903 A1 | 2/2023 | Chen et al. | |
| 2023/0150552 A1 | 5/2023 | Liu et al. | |
| 2023/0311952 A1* | 10/2023 | Kikuchi | B60W 60/0053 701/23 |
| 2024/0070213 A1* | 2/2024 | Xu | G06F 16/2379 |

FOREIGN PATENT DOCUMENTS

| | | |
|---|---|---|
| JP | 2017200786 A | 11/2017 |
| JP | 2018-197080 A | 12/2018 |
| WO | 2017/158772 A1 | 9/2017 |
| WO | 2017179193 A1 | 10/2017 |
| WO | 2018109868 A1 | 6/2018 |
| WO | 2018/220826 A1 | 12/2018 |
| WO | 2021/005645 A1 | 1/2021 |

OTHER PUBLICATIONS

International Search Report and Written Opinion for PCT/JP2019/026827 mailed Sep. 9, 2019.

* cited by examiner

FIG. 2

| UPPER LIMIT SPEED | VEHICLE SPEED AT WHICH STARTING TO TAKE OVER DRIVING | DIFFERENCE | NOTIFICATION INTENSITY |
|---|---|---|---|
| 80kph | 65kph | -15kph | STRONG |
| 60kph | 50kph | -10kph | MEDIUM |
| 50kph | 45kph | -5kph | WEAK |

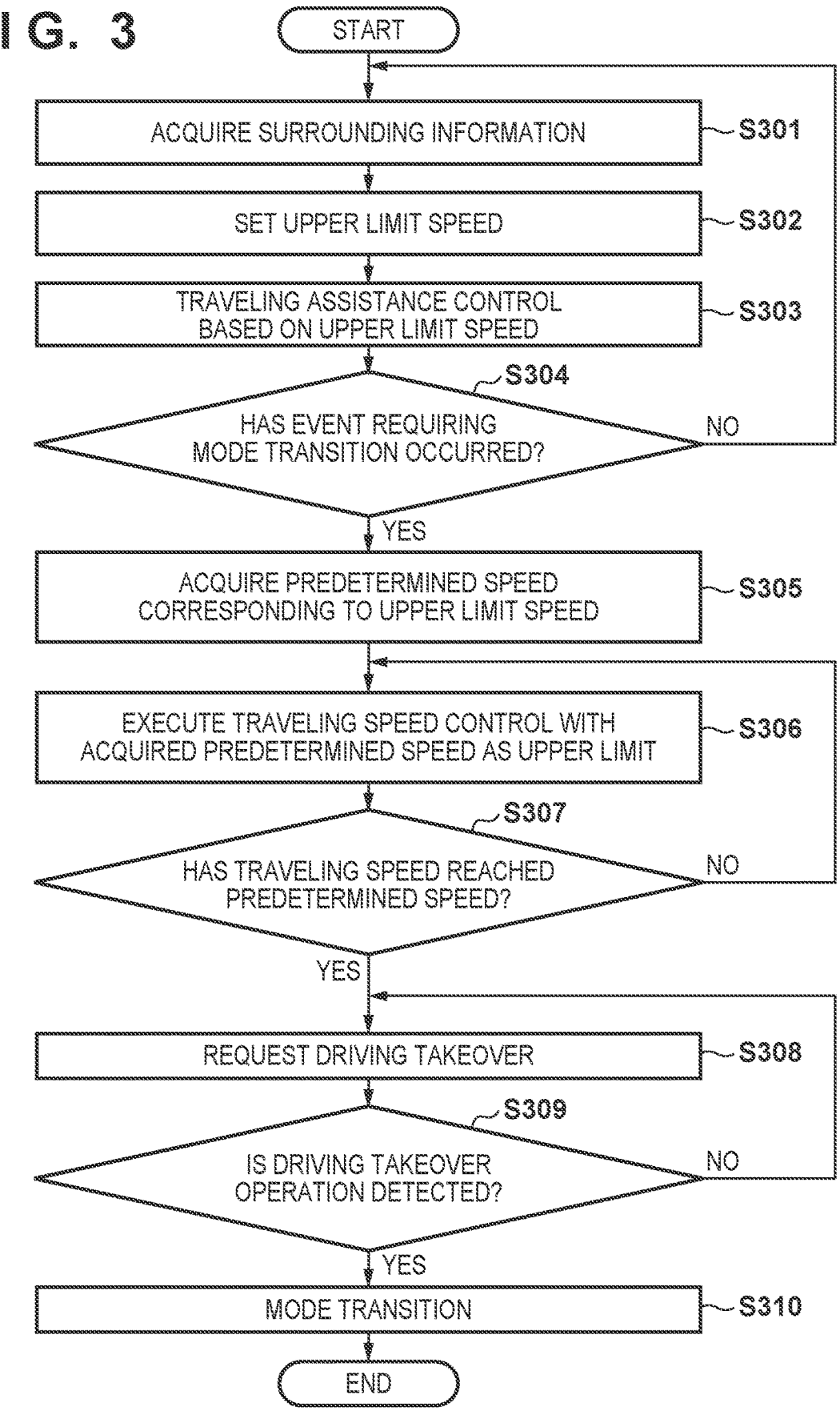

FIG. 4

| UPPER LIMIT SPEED | ELAPSED TIME | VEHICLE SPEED AT WHICH STARTING TO TAKE OVER DRIVING | DIFFERENCE | NOTIFICATION INTENSITY |
|---|---|---|---|---|
| 80kph | 30 MINUTES OR MORE | 65kph | -15kph | STRONG |
| | LESS THAN 30 MINUTES | 70kph | -10kph | MEDIUM |

FIG. 5

| UPPER LIMIT SPEED | ACCELERATION | VEHICLE SPEED AT WHICH STARTING TO TAKE OVER DRIVING | DIFFERENCE | NOTIFICATION INTENSITY |
|---|---|---|---|---|
| 80kph | 2m/s^2 OR MORE | 65kph | -15kph | STRONG |
| | LESS THAN 2m/s^2 | 70kph | -10kph | MEDIUM |

FIG. 6

| UPPER LIMIT SPEED | EXECUTED EXTERNAL TASK | VEHICLE SPEED AT WHICH STARTING TO TAKE OVER DRIVING | DIFFERENCE | NOTIFICATION INTENSITY |
|---|---|---|---|---|
| 80kph | AWAY FROM SEAT | 65kph | -15kph | STRONG |
| | TAKING NAP | 70kph | -10kph | STRONG |
| | OPERATING DEVICE | 75kph | -5kph | MEDIUM |

CONTROL SYSTEM FOR VEHICLE AND CONTROL METHOD FOR VEHICLE

CROSS-REFERENCE TO RELATED APPLICATION(S)

This application is a continuation of U.S. patent application Ser. No. 17/562,379 filed on Dec. 27, 2021, which is a continuation of International Patent Application No. PCT/JP2019/026827 filed on Jul. 5, 2019, the entire disclosures of both of the above applications are incorporated herein by reference.

BACKGROUND OF THE INVENTION

Field of the Invention

The present disclosure relates to a technique for controlling a vehicle.

Description of the Related Art

Conventionally, there is a case where a vehicle enabled to perform driving support control can be operated in a plurality of modes having different degrees of operation required for a driver. For example, there is a mode in which an area where the vehicle can travel is limited to an expressway but the traveling is controlled on the system side without requiring driver's operation. In addition, there is a mode in which the system controls traveling on the condition that the driver grips the steering wheel or monitors the surroundings. In addition, there is a mode in which the vehicle automatically travels following a preceding vehicle traveling ahead in a traffic jam.

For example, International Publication No. 2018/220826 discloses a technique for notifying a driver that a traveling speed of the self-vehicle is predicted to exceed a predetermined speed as a traffic jam has been resolved during automated traveling following a preceding vehicle in a traffic jam.

SUMMARY OF THE INVENTION

As described above, in a case where the vehicle supports a plurality of modes having different degrees of operation requested to the driver, for example, a situation will be considered in which changing a mode in which the vehicle (system) performs travel control to a mode in which the driver's operation is requested. In this situation, when causing the mode to transition, it is requested the user to take over driving, but the timing of appropriately making the request varies in accordance with the traveling state of the self-vehicle and the surrounding environment.

For example, as one of the surrounding environments, a speed limit on a road is exemplified. Regarding the speed limit, in addition to a legal speed defined in advance for each road, there is a case that the speed restriction may be imposed in accordance with the occurrence of an accident, weather, or the like. As described above, in a situation in which various speed limits can be set, if notifying the driver of taking over driving or the like is performed at a fixed timing when the mode is changed as described above, there is a possibility that the timing of notification is not appropriate and a delay occurs in the driver's operation. As a result, there is a problem that the difficulty of taking over driving in the mode transition increases. In International Publication No. 2018/220826, it is not considered to control the timing of notification at the time of mode transition in accordance with a travel environment.

Therefore, an aspect of the present disclosure enables appropriate notification at the time of transition of the traveling state by controlling the timing of notification regarding taking over driving in accordance with the travel environment and realizes vehicle control with high passenger convenience.

According to some embodiments, a control system for a vehicle capable of traveling in a first traveling state and a second traveling state is provided. The second traveling state requires an operation related to traveling by a passenger more than the first traveling state. The system changes, based on a traveling situation of the vehicle, an upper limit speed at which the vehicle can travel in the first traveling state. The system performs notification to the passenger of a request for a predetermined operation at a timing when a traveling speed of the vehicle reaches a predetermined speed when switching from the first traveling state to the second traveling state. The system switches to the second traveling state when detecting the predetermined operation by the passenger. A difference between the upper limit speed and the predetermined speed is increased in a case where the upper limit speed is high compared to a case where the upper limit speed is low.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2 is a diagram for explaining a relationship between an upper limit speed and timing of notification of taking over driving according to a first embodiment.

FIG. 3 is a flowchart of processing of controlling mode transition according to the first embodiment.

FIG. 4 is a diagram for explaining a relationship between an upper limit speed and timing of notification of taking over driving according to a second embodiment.

FIG. 5 is a diagram for explaining a relationship between an upper limit speed and timing of notification of taking over driving according to a third embodiment.

FIG. 6 is a diagram for explaining a relationship between an upper limit speed and timing of notification of taking over driving according to a fourth embodiment.

DESCRIPTION OF THE EMBODIMENTS

Figure 1:
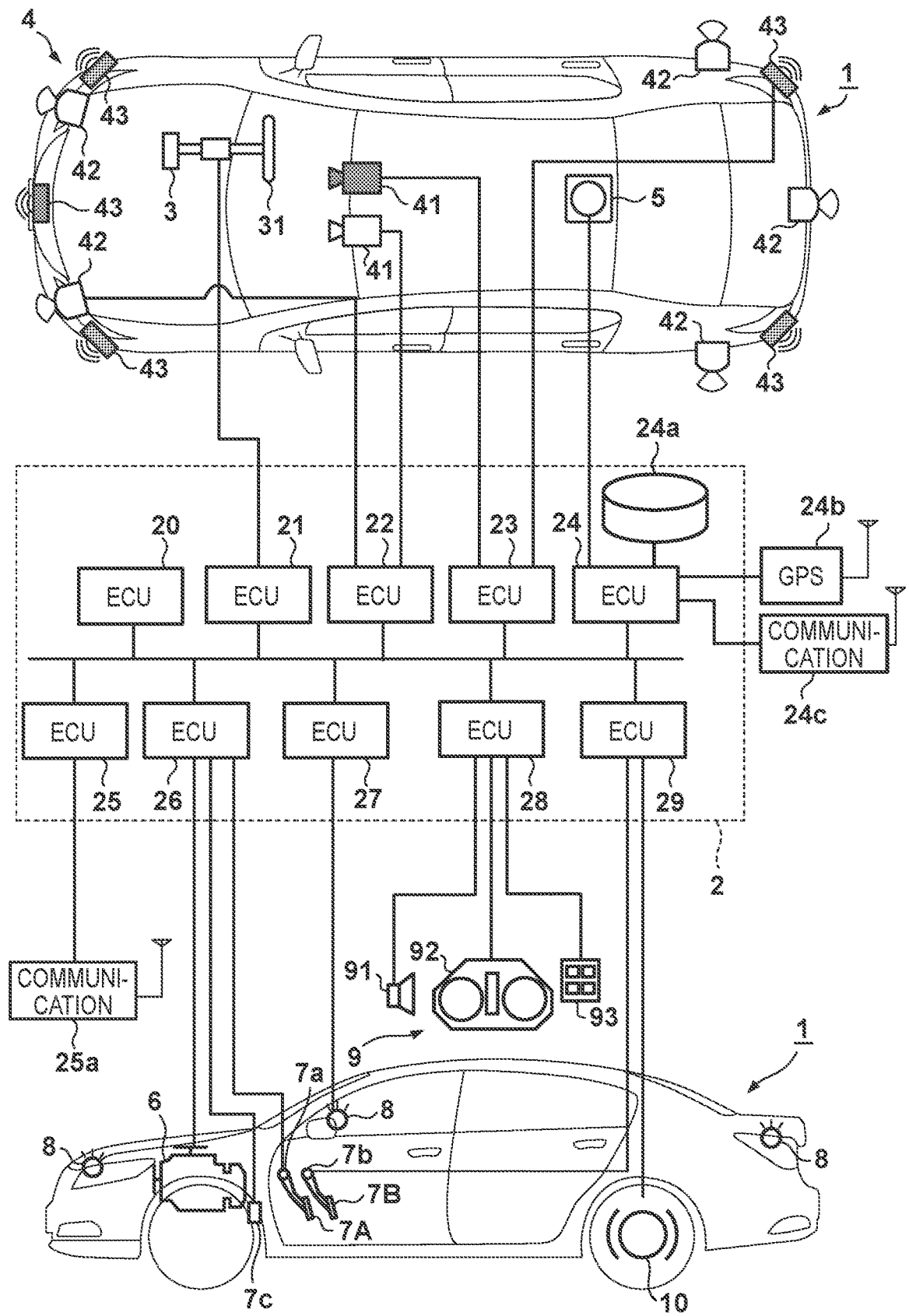
FIG. 1 is a block diagram of a vehicle control device according to an embodiment of the present disclosure.

Hereinafter, embodiments will be described in detail with reference to the accompanying drawings. Note that the following embodiments do not limit the invention according to the claims, and not all combinations of features described in the embodiments are essential to the invention. Two or more of a plurality of the features described in the embodiments may be optionally combined together. In addition, the same or similar constituent elements are denoted by the same reference numerals, and overlapping descriptions will be omitted.

First Embodiment

Vehicle Configuration

FIG. 1 is a block diagram of a vehicle control device according to an embodiment of the present disclosure, which controls a vehicle 1. In FIG. 1, the vehicle 1 is schematically illustrated in a plan view and a side view. The vehicle 1 is, for example, a sedan-type four-wheeled passenger vehicle.

The control device of FIG. 1 includes a control system 2. The control system 2 includes a plurality of electronic control units (ECUs) 20 to 29 communicably connected by an in-vehicle network. Each ECU functions as a computer that includes a processor represented by a central processing unit (CPU), a storage device such as a semiconductor memory or the like, an interface with an external device, and the like. The storage device stores programs executed by the processor, data used for processing by the processor, and the like. Each ECU may include a plurality of processors, storage devices, interfaces, and the like.

Hereinafter, functions and the like assigned to each of the ECUs 20 to 29 will be described. Note that the number of ECUs and the functions assigned to the ECUs can be designed as appropriate and can be subdivided or integrated compared with the present embodiment.

The ECU 20 executes control related to automated driving of the vehicle 1. In automated driving, at least one of the steering and acceleration/deceleration of the vehicle 1 is automatically controlled. In an example of control described later, both steering and acceleration/deceleration are controlled automatically.

The ECU 21 controls an electric power steering device 3. The electric power steering device 3 includes a mechanism that steers a front wheel in accordance with a driver's driving operation (steering operation) on a steering wheel 31. In addition, the electric power steering device 3 includes a motor that exerts a driving force for assisting the steering operation and automatically steering the front wheel, a sensor that detects a steering angle, and the like. When the driving state of the vehicle 1 is automated driving, the ECU 21 automatically controls the electric power steering device 3 in response to an instruction from the ECU 20 and controls a direction of advance of the vehicle 1.

The ECUs 22 and 23 perform control of detection units 41 to 43 that detect the surrounding situation of the vehicle and information processing of the detection result. The detection unit 41 is a camera that captures an image of the front of the vehicle 1 (hereinafter, it may be referred to as a camera 41) and is attached to the vehicle interior side of the windshield at the front of the roof of the vehicle 1 in the present embodiment. By analyzing the image captured by the camera 41, it is possible to extract a contour of an object or extract a division line (white line or the like) of a lane on a road.

The detection unit 42 is a light detection and ranging (lidar) (hereinafter, it may be referred to as a lidar 42), detects an object around the vehicle 1, measures a distance to the object, and the like. In the present embodiment, five lidars 42 are provided, one at each corner portion of a front portion of the vehicle 1, one at the center of a rear portion of the vehicle 1, and one at each side of the rear portion of the vehicle 1. The detection unit 43 is a millimeter-wave radar (hereinafter, it may be referred to as a radar 43), detects an object around the vehicle 1, and measures a distance to the object. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each lidar 42 and executes information processing on the detection result. The ECU 23 controls the other camera 41 and each of the radars 43 and executes information processing on the detection result. Since two sets of devices for detecting the surrounding situation of the vehicle are provided, the reliability of the detection result can be improved, and since different types of detection units such as a camera, lidar, and radar are provided, the surrounding environment of the vehicle can be analyzed in multiple ways.

The ECU 24 controls a gyro sensor 5, a global positioning system (GPS) sensor 24b, and a communication device 24c and executes information processing on a detection result or a communication result. The gyro sensor 5 detects a rotational motion of the vehicle 1. The course of the vehicle 1 can be determined based on the detection result of the gyro sensor 5, the wheel speed, and the like. The GPS sensor 24b detects the current position of the vehicle 1. The communication device 24c performs wireless communication with a server that provides map information and traffic information and acquires these pieces of information. The ECU 24 can access a map information database 24a constructed in the storage device, and the ECU 24 performs a search for a route from the current position to a destination and the like.

The ECU 25 includes a communication device 25a for vehicle-to-vehicle communication. The communication device 25a performs wireless communication with other surrounding vehicles to exchange information between the vehicles.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine according to the driving operation (accelerator operation or acceleration operation) of the driver detected by an operation detection sensor 7a provided on an accelerator pedal 7A and switches the gear ratio of the transmission based on information such as the vehicle speed detected by a vehicle speed sensor 7c and the like. When the driving state of the vehicle 1 is automated driving, the ECU 26 automatically controls the power plant 6 in response to an instruction from the ECU 20 and controls the acceleration/deceleration of the vehicle 1.

The ECU 27 controls a light device (headlight, tail light, and the like) including a direction indicator 8 (blinker). In the example of FIG. 1, the direction indicators 8 are provided at the front portion, the door mirror, and the rear portion of the vehicle 1.

The ECU 28 controls an input/output device 9. The input/output device 9 outputs information to the driver and receives an input of information from the driver. A sound output device 91 notifies the driver of information by sound. A display device 92 notifies the driver of information by displaying an image. The display device 92 is arranged, for example, in front of a driver's seat and constitutes an instrument panel or the like. Note that, although the sound and the image display have been exemplified here, it is also possible to report information by using vibration or light. In addition, it is also possible to report information by using a combination of some of the sound, image display, vibration, and light. Furthermore, it is also possible to change the combination or the notification mode in accordance with the level (for example, the degree of urgency) of information to be reported.

An input device 93 is a switch group that is arranged at a position where the driver can operate it and is used to input an instruction to the vehicle 1. The input device 93 may also include a voice input device.

The ECU 29 controls a brake device 10 and a parking brake (not illustrated in the drawings). The brake device 10 is, for example, a disc brake device, and is provided on each wheel of the vehicle 1 to decelerate or stop the vehicle 1 by applying resistance to the rotation of the wheel. The ECU 29 controls the operation of the brake device 10 in response to the driver's driving operation (brake operation) detected by an operation detection sensor 7b provided on a brake pedal 7B, for example. When the driving state of the vehicle 1 is automated driving, the ECU 29 automatically controls the brake device 10 in response to an instruction from the ECU 20 and controls the deceleration and stop of the vehicle 1. The brake device 10 and the parking brake can also operate to maintain a stopped state of the vehicle 1. In addition, in a case where the transmission of the power plant 6 includes a parking lock mechanism, the parking lock mechanism can also be operated to maintain the stopped state of the vehicle 1.

Example of Control Function

The control function of the vehicle 1 according to the present embodiment includes a travel-related function related to control of driving, braking, and steering of the vehicle 1, and a notification function related to notifying the driver of information. Note that each control function may be provided with a plurality of control levels in accordance with the performance or the like of the vehicle 1.

Examples of the travel-related functions include vehicle speed keeping control, acceleration/deceleration timing control, lane-keeping control, lane deviation suppression control (out-of-road deviation suppression control), lane change control, preceding vehicle following control, collision reduction brake control, and erroneous start suppression control. Examples of the notification function include adjacent vehicle notification control, preceding vehicle start notification control, and taking over driving request notification control.

The vehicle speed keeping control is a control of keeping traveling at a predetermined vehicle speed. For example, an accelerator or a brake is controlled in order to keep a vehicle speed in accordance with a shape of a road on which the vehicle is traveling or a change in an external environment. The acceleration/deceleration timing control is a control of determining the timing of acceleration/deceleration of the vehicle based on a traveling state of the vehicle, transition to another operation, and the like. For example, even in a case where the same operation is performed in accordance with a curvature of a curve, a road shape, the travel position, and the like, the timing of acceleration/deceleration is different, and thus, these timings are controlled. In addition, vehicle speed control is performed such that the vehicle speed approaches a target traveling speed by combining vehicle speed keeping control and acceleration/deceleration timing control.

The lane-keeping control is one of the controls of the position of the vehicle with respect to a lane and is the control of causing the vehicle to automatically travel on the travel trajectory set in the lane (without depending on the driving operation of the driver). The lane deviation suppression control is one of the controls of the position of the vehicle with respect to the lane, and detects a white line or a traveling road boundary (median strip, planting (lawn), curbs, and the like) and automatically performs steering control so that the vehicle does not exceed the line. The lane deviation suppression control and the lane-keeping control have different functions as described above.

The lane change control is a control of automatically moving a vehicle from a lane in which the vehicle is traveling to an adjacent lane. By repeating the lane change control, it is also possible to move across a plurality of lanes or to return to the original lane after temporarily changing the lane to the adjacent lane. The preceding vehicle following control is a control of automatically following another vehicle traveling in front of the self-vehicle and performing traveling. The collision reduction brake control is a control of assisting to avoid collision by automatically braking in a case where the possibility of collision with an obstacle in front of the vehicle increases. The erroneous start suppression control is a control that limits the acceleration of the vehicle in a case where the acceleration operation by the driver is equal to or more than a predetermined amount in a stopped state of the vehicle and suppresses sudden start.

The adjacent vehicle notification control is a control of notifying the driver of the presence of another vehicle traveling in the adjacent lane adjacent to the traveling lane of the self-vehicle, and for example, notifies the driver of the presence of another vehicle traveling on the side or the rear of the self-vehicle. The preceding vehicle start notification control is a control of reporting that the self-vehicle and another vehicle ahead of the self-vehicle are in a stopped state and the other vehicle ahead of the self-vehicle has started. The taking over driving request notification control is, for example, a control of requesting an operation to the driver (passenger) before and after a change when the traveling mode of the vehicle 1 changes. Since the content of the operation requested to the driver varies in accordance with the traveling mode, the notification content and the timing of notification may change in accordance with when the content of the operation requested before and after the change. These notifications can be performed by an in-vehicle notification device.

Outline of Operation

An outline of control of the vehicle according to the present embodiment will be described with reference to FIG. 2. As examples of the traveling mode, a first traveling mode in which an operation (gripping steering, monitoring surroundings, and the like) by the driver is not requested while the vehicle 1 is traveling and a second traveling mode in which an operation by the driver is requested will be described as examples. Note that the operation requested in the second traveling mode is not particularly limited. In addition, in the first traveling mode, it is not limited to a state in which the driver's operation is not accepted, and the driver's operation may be accepted as required.

It is assumed that the vehicle 1 according to the present embodiment can transition from the first traveling mode to the second traveling mode and transition from the second traveling mode to the first traveling mode. A condition of the mode transition is defined in advance. When the mode transition is performed, the driver is notified of the mode transition. For example, at the time of transition from the first traveling mode to the second traveling mode, a notification is given to the driver, and in a case where the driver performs a predetermined action or operation in response to the notification, the traveling mode transitions to the second traveling mode.

As described above, the appropriate timing of notification of the mode transition (taking over driving) to the driver varies in accordance with the travel environment, the state of the driver, and the like. That is, in a case where the timing of notification at the time of the transition of the traveling mode is fixed, the timing of taking over driving is limited depending on the situation at that time, and the convenience of the operation by the user deteriorates. Therefore, in the present embodiment, the timing of notification at the time of mode transition is controlled in consideration of the traveling situation.

FIG. 2 is a diagram for explaining a correspondence relationship between an upper limit speed and a timing of notification according to the present embodiment. The upper limit speed according to the present embodiment indicates the upper limit value of the traveling speed set in the state of traveling in the first traveling mode. The upper limit speed is switched in accordance with the surrounding environment during traveling. Examples of an element for switching the upper limit speed include a traveling speed set for the road on which the vehicle is traveling, a road shape, detection accuracy of a surrounding environment, a duration of the first traveling mode (continuous stable traveling), and the like, but not particularly limited thereto. In the present embodiment, a case where the upper limit speed is in three stages (80 kph, 60 kph, and 50 kph) will be described as an example. In addition, the notification intensity illustrated in FIG. 2 indicates the intensity at the time of performing notification, and is configured in three stages of "strong", "medium", and "weak". The notification content is not particularly limited but is configured such that, for example, the combination and the like of the volume and the notification method is switched, and the driver can easily recognize the request for taking over as the notification intensity increases.

In a case where the set upper limit speed is 80 kph, when the mode transitions from the first traveling mode to the second traveling mode, the mode transition is reported to the driver at the timing when the traveling speed of the self-vehicle reaches 65 kph, and a predetermined operation by the driver is requested. That is, in this case, the difference between the upper limit speed and the traveling speed of the self-vehicle is 15 kph. In addition, the intensity related to the notification at this time is set to "strong".

In addition, in a case where the set upper limit speed is 60 kph, when the mode transitions from the first traveling mode to the second traveling mode, the mode transition is reported to the driver at the timing when the traveling speed of the self-vehicle reaches 50 kph, and a predetermined operation by the driver is requested. That is, in this case, the difference between the upper limit speed and the traveling speed of the self-vehicle is 10 kph. In addition, the intensity related to the notification at this time is set to "medium".

In addition, in a case where the set upper limit speed is 50 kph, when the mode transitions from the first traveling mode to the second traveling mode, the mode transition is reported to the driver at the timing when the traveling speed of the self-vehicle reaches 45 kph, and a predetermined operation by the driver is requested. That is, in this case, the difference between the upper limit speed and the traveling speed of the self-vehicle is 5 kph. In addition, the intensity related to the notification at this time is set to "weak".

That is, the timing (vehicle speed of starting to take over driving) at which the notification of the request for taking over at the time of the mode transition is made and the notification intensity thereof are changed in accordance with the set upper limit speed. As the upper limit speed is higher, it tends to take more time for the driver to recognize the surrounding environment and situation at the time of taking over driving. Therefore, in a case where the upper limit speed is high, it is necessary to report to the driver earlier compared to a case where the upper limit speed is low, provide a longer time to the driver before taking over driving, and get the driver prepared for the driving. Therefore, it is effective to increase the difference from the vehicle speed at which starting to take over driving in accordance with the height of the upper limit speed. Note that the traveling speed of the self-vehicle to be the timing of notification of taking over driving illustrated in FIG. 2 may be the case of having become the traveling speed illustrated in FIG. 2 by either deceleration or acceleration. Alternatively, either acceleration or deceleration may be performed in accordance with the mode before and after the transition. In addition, in FIG. 2, the vehicle speed at which starting to take over driving is set as a threshold (upper limit and lower limit), but the present invention is not limited thereto. For example, the vehicle speed at which starting to take over driving may be set in a range.

In the above description, the traveling speed set for the road is described as one of the elements for switching the upper limit speed. The traveling speed set for the road may change in accordance with the situation in addition to the predefined legal speed. For example, there is a case where a speed limit lower than a legal speed is temporarily set in accordance with the occurrence of an accident or bad weather. It is assumed that the temporarily set speed limit can be grasped by, for example, a speed limit sign or the like arranged on an expressway.

In addition, the road shape is described as one of the elements for switching the upper limit speed. For example, the upper limit speed may be switched in accordance with the turning curvature in a curve (R shape) or the like of the road. In addition, the detection accuracy of the surrounding environment is described as one of the elements for switching the upper limit speed. For example, the detection accuracy may be based on a state of a road surface, weather, or the like, or may be based on a deterioration state of a detection unit (a sensor or the like) included in the self-vehicle, a change (limitation) in a detection range, or the like.

In the present embodiment, a higher upper limit speed is to be set in a case where it is possible to travel stably, such as a case where surrounding information can be appropriately acquired by a detection unit or the like, a case where a shape or undulation of a road on which the vehicle is traveling does not exceed a certain change, and the like.

Processing Flow

A processing flow of control processing according to the present embodiment will be described with reference to FIG. 3. In each control of this processing flow, various ECUs and the like included in the vehicle as described above perform processing in cooperation with each other, but here, a processing entity is illustrated as the control system 2 of the vehicle 1 in order to simplify the description. It is assumed that this processing flow is started when traveling in the first traveling mode described above.

In S301, the control system 2 acquires information on the surrounding environment. Here, the information on the surrounding environment may be acquired based on, for example, map information. Alternatively, an image of a sign in the surrounding environment may be acquired by a camera provided in the vehicle 1, and the information on the surrounding environment may be acquired by analyzing the image. Alternatively, data regarding the upper limit speed may be acquired from an external device via the communication device 24c. Note that a method of acquiring information on the surrounding environment is not particularly limited, and a plurality of methods may be combined, or switching may be performed in accordance with the travel environment (weather, travel place, or the like). In addition, information (vehicle speed or the like) set by the driver may be referred to and used. For example, it is possible to combine a vehicle speed (set vehicle speed) set by the driver with a vehicle speed acquired from a sign of the surrounding environment to be treated as the surrounding information regarding the travel environment. The value of the set vehicle speed that can be set by the driver may vary in accordance with the traveling mode or the like.

In S302, the control system 2 sets the upper limit speed based on the surrounding environment during traveling. Specifically, the upper limit speed as illustrated in FIG. 2 is determined and set based on the information on the surrounding environment acquired in S301. Here, it is assumed that one of the upper limit speeds in three stages illustrated in FIG. 2 is set. For example, in a case where the upper limit of the traveling speed defined for the road on which the vehicle is traveling is 80 kph, the highest speed (80 kph in the example of FIG. 2) among the upper limit speeds equal to or lower than the upper limit speed is set. Alternatively, in a case where the lower limit of the traveling speed is defined for the road, the upper limit speed may be set so as not to fall below the lower limit. In addition, as described above, in a case where the set vehicle speed by the driver is used, the value of the set vehicle speed may be used in preference to the value of the vehicle speed based on the sign. For example, in a case where the set vehicle speed is higher than the vehicle speed indicated by the sign, a high upper limit speed may be set in accordance with the set vehicle speed. In addition, in a case where the set vehicle speed is smaller than the vehicle speed indicated by the sign, a low upper limit speed may be set in accordance with the set vehicle speed.

In S303, the control system 2 executes the traveling assistance control in the first traveling mode based on the upper limit speed set in S302. The content of the traveling assistance control here is not particularly limited, and examples thereof include the vehicle speed keeping control, the lane-keeping control, and the preceding vehicle following control as described above.

In S304, the control system 2 determines whether or not an event requiring mode transition has occurred. In this example, it is determined whether or not an event requiring transition from the first traveling mode to the second traveling mode has occurred. The event here is not particularly limited, and examples thereof include a case where the end of the area where the vehicle can travel in the first traveling mode is approaching, a case where it is getting difficult to continue the first traveling mode due to a change in the surrounding environment. In a case where it is determined that the event requiring the mode transition has occurred (YES in S304), the process proceeds to S305. In a case where it is determined that the event does not occur (NO in S304), the process returns to S301, and the processing is repeated.

In S305, the control system 2 acquires a predetermined speed (vehicle speed at which starting to take over driving) corresponding to the upper limit speed. In this example, it is assumed that the information illustrated in FIG. 2 is held in the storage unit and information on the vehicle speed at which starting to take over driving corresponding to the upper limit speed can be acquired by referring to this information.

In S306, the control system 2 executes the traveling speed control of the self-vehicle with the predetermined speed acquired in S305 as the upper limit. As the traveling assistance control here, in addition to acceleration/deceleration of the traveling speed, control of the travel position in the lane and control of adjusting the inter-vehicle distance with the surrounding vehicle may be performed. In addition, the degree of acceleration/deceleration of the traveling speed may change in accordance with the surrounding environment or the urgency of the event requiring the mode transition detected in S304.

In S307, the control system 2 determines whether or not the traveling speed of the self-vehicle has reached the predetermined speed acquired in S305. In a case where it is determined that the traveling speed of the self-vehicle has reached the predetermined speed (YES in S307), the process proceeds to S308. In a case where it is determined that the traveling speed has not reached the predetermined speed (NO in S307), the process returns to S306, and the processing is repeated.

In S308, the control system 2 requests the driver to take over driving according to the transition of the traveling mode. The notification intensity related to the request here is performed with the intensity illustrated in FIG. 2. In addition, regarding the request method, it may be displayed on a display or may be reported by sound, for example. In addition, the content of the requested operation may be reported. Here, examples of the notification contents include contents for prompting monitoring of surroundings, gripping of the steering, and the like.

In S309, the control system 2 determines whether or not the driver has performed a predetermined operation in response to the request for taking over driving in S308. For example, in a case where it is to grip the steering due to the mode transition, the determination may be made based on detection results by various sensors provided in the steering. In a case where it is necessary to monitor the surroundings, the direction of the face, the direction of the line of sight, or the like of the driver may be determined based on a result of detection by various sensors provided in the vehicle. In a case where the operation of taking over driving has been detected (YES in S309), the process proceeds to S310. In a case where the operation of taking over driving has not been detected (NO in S309), the process returns to S308 and the processing is repeated. In a case where the process in S308 is performed again, the manner of request (notification intensity) may be changed from the previous notification method. For example, in a case where the notification intensity is "medium", the notification intensity may be changed to "strong", and the notification intensity may be increased so as to increase the volume of the sound or to additionally perform a predetermined display.

In S310, the control system 2 causes the traveling mode transition. In this example, a transition is made from the first traveling mode to the second traveling mode. In this case, the driver may be notified of the mode transition each before and after the transition. Then, the processing flow ends.

As described above, in the present embodiment, by controlling the timing of notification related to taking over driving in accordance with the travel environment, it is possible to appropriately perform notification at the time of transition of the traveling state, and it is possible to perform vehicle control with high user convenience.

Second Embodiment

In the first embodiment, the control of the timing of notification at the time of transition from the first traveling mode to the second traveling mode has been described. In the present embodiment, an embodiment in which an elapsed time from the transition to the first traveling mode is taken into consideration will be further described. Note that the description of configurations overlapping with the first embodiment will be omitted, and only differences will be described.

FIG. 4 is a diagram for explaining a correspondence relationship between an upper limit speed and a timing of notification according to the present embodiment. FIG. 4 includes information on elapsed time in addition to the configuration of FIG. 2 described in the first embodiment. The elapsed time according to the present embodiment indicates an elapsed time from the transition to the first traveling mode. In the case of the example of FIG. 4, in a case where the upper limit speed is set to 80 kph, the timing of notification related to the request for taking over driving is switched in accordance with whether or not a time equal to or longer than a predetermined threshold (here, 30 minutes) has elapsed since the transition to the first traveling mode.

Here, in a case where 30 minutes or more have elapsed since the transition to the first traveling mode, the timing of notification related to the request for taking over driving is a timing when the traveling speed of the self-vehicle reaches 65 kph, and the difference between the upper limit speed and the traveling speed of the self-vehicle, in this case, is 15 kph. In addition, the intensity related to the notification at this time is set to "strong".

In addition, in a case where less than 30 minutes have elapsed since the transition to the first traveling mode, the timing of notification related to the request for taking over driving is a timing when the traveling speed of the self-vehicle reaches 70 kph, and the difference between the upper limit speed and the traveling speed of the self-vehicle, in this case, is 10 kph. In addition, the intensity related to the notification at this time is set to "medium".

That is, in a case where a time being longer has elapsed since the transition to the first traveling mode, the timing of notification related to the request for taking over driving is controlled such that the difference between the upper limit speed and the traveling speed of the self-vehicle increases. Then, based on this, the processing flow of FIG. 3 described in the first embodiment is performed. Note that, in FIG. 4, speed 80 kph has been described as an example of the upper limit speed, but a similar threshold may be provided for another upper limit speed. In addition, the threshold indicated by the elapsed time is not limited to one only, and a plurality of thresholds may be used. In addition, different thresholds may be used in accordance with the upper limit speed.

As described above, according to the present embodiment, in addition to the effects of the first embodiment, it is possible to control the timing of notification in accordance with the traveling state and the duration.

Third Embodiment

In the present embodiment, a description will be given assuming that the first traveling mode is a traveling mode that can be continued when following a preceding vehicle in a lane in which the self-vehicle is traveling. Note that the description of configurations overlapping with the first embodiment will be omitted, and only differences will be described.

FIG. 5 is a diagram for explaining a correspondence relationship between an upper limit speed and a timing of notification according to the present embodiment. FIG. 5 includes information on acceleration in addition to the configuration of FIG. 2 described in the first embodiment. The acceleration according to the present embodiment indicates the acceleration of the preceding vehicle being followed in the first traveling mode. In the case of the example of FIG. 5, in a case where the upper limit speed is set to 80 kph, the timing of notification related to the request for taking over driving is switched in accordance with whether or not the acceleration of the preceding vehicle is a predetermined threshold (in this example, 2 m/s$^2$) or more. The acceleration of the preceding vehicle may be calculated from the traveling speed, the inter-vehicle distance, and the like of the self-vehicle, and the calculation method thereof is not particularly limited.

Here, in a case where the acceleration of the preceding vehicle being followed is 2 m/s$^2$ or more, the timing of notification related to the request for taking over driving is a timing when the traveling speed of the self-vehicle reaches 65 kph, and the difference between the upper limit speed and the traveling speed of the self-vehicle, in this case, is 15 kph. In addition, the intensity related to the notification at this time is set to "strong".

In addition, in a case where the acceleration of the preceding vehicle being followed is less than 2 m/s$^2$, the timing of notification related to the request for taking over driving is a timing when the traveling speed of the self-vehicle reaches 70 kph, and the difference between the upper limit speed and the traveling speed of the self-vehicle, in this case, is 10 kph. In addition, the intensity related to the notification at this time is set to "medium".

That is, in a case where the acceleration of the preceding vehicle being followed in the first traveling mode is higher, the timing of notification related to the request for taking over driving is controlled such that the difference between the upper limit speed and the traveling speed of the self-vehicle increases. Then, based on this, the processing flow of FIG. 3 described in the first embodiment is performed. With such control, for example, even in a case where the preceding vehicle suddenly accelerates, the timing of notification can be switched in accordance with the traveling state.

Note that, in FIG. 5, speed 80 kph has been described as an example of the upper limit speed, but a similar threshold may be provided for another upper limit speed. In addition, the threshold indicated by the acceleration is not limited to one only, and a plurality of thresholds may be used. In addition, different thresholds may be used in accordance with the upper limit speed. In addition, in the above example, the acceleration of the preceding vehicle has been described as an example, but the acceleration may be based on the acceleration of the self-vehicle accompanying the following-up.

As described above, according to the present embodiment, in addition to the effects of the first embodiment, it is possible to control the timing of notification in accordance with the acceleration during follow-up traveling.

Fourth Embodiment

In the first embodiment, the control at the time of transition from the first traveling mode to the second traveling mode has been described. In the present embodiment, an embodiment in consideration of an action executed by the driver during the first traveling mode will be further described. Note that the description of configurations overlapping with the first embodiment will be omitted, and only differences will be described.

As described above, in the first traveling mode, an operation (gripping the steering, monitoring surroundings, or the like) by the driver related to the travel control is not required. Therefore, in the first traveling mode, the driver can execute an action other than the operation related to traveling. Examples of the action other than the operation related to traveling include having a conversation while facing a passenger, operating various devices such as a smartphone or the like, having a nap, leaving a seat (including a state where a seat belt is removed), having a meal, and the like. Here, such actions are collectively referred to as "external tasks". Note that, in the present embodiment, the content of the external task performed by the driver can be determined based on a detection result of a detection unit (not illustrated in the drawings) such as an in-vehicle camera or the like provided in the vehicle 1.

FIG. 6 is a diagram for explaining a correspondence relationship between an upper limit speed and a timing of notification according to the present embodiment. FIG. 6 includes information on an executed external task in addition to the configuration of FIG. 2 described in the first embodiment. The executed external task according to the present embodiment indicates the contents of the external task being executed by the driver in the first traveling mode. In the case of the example of FIG. 6, in a case where the upper limit speed is set to 80 kph, the timing of notification of taking over driving is switched in accordance with the action performed by the driver.

Here, in a case where the driver is away from the seat in the middle of the first traveling mode, the timing of notification related to the request for taking over driving is a timing when the traveling speed of the self-vehicle reaches 65 kph, and the difference between the upper limit speed and the traveling speed of the self-vehicle, in this case, is 15 kph. In addition, the intensity related to the notification at this time is set to "strong".

In addition, in a case where the driver is taking a nap (in a state in which eyes are closed) in the middle of the first traveling mode, the timing of notification related to the request for taking over driving is a timing when the traveling speed of the self-vehicle reaches 70 kph, and the difference between the upper limit speed and the traveling speed of the self-vehicle, in this case, is 10 kph. In addition, the intensity related to the notification at this time is set to "strong".

In addition, in a case where the driver operates a device such as a smartphone or the like in the middle of the first traveling mode, the timing of notification related to the request for taking over driving is a timing when the traveling speed of the self-vehicle reaches 75 kph, and the difference between the upper limit speed and the traveling speed of the self-vehicle, in this case, is 5 kph. In addition, the intensity related to the notification at this time is set to "medium".

That is, in the middle of the first traveling mode, the timing of notification related to the request for taking over driving is controlled such that the difference between the upper limit speed and the traveling speed of the self-vehicle increases as the external task that is assumed to require a longer period of time required for taking over driving is performed based on the content of the external task being executed by the driver. Then, based on this, the processing flow of FIG. 3 described in the first embodiment is performed.

Note that, in the example of FIG. 6, the timing of notification of taking over driving is associated with the external task on a one-to-one basis, but the present invention is not limited thereto. For example, it may be configured such that a finer state of the driver is recognized and the timing of notification of taking over driving is controlled in accordance with the state (degree). In addition, in FIG. 6, speed 80 kph has been described as an example of the upper limit speed, but a similar external task may be associated with another upper limit speed. In addition, the contents to be reported may be made different in accordance with the type and contents of the external task being executed by the driver.

As described above, according to the present embodiment, in addition to the effects of the first embodiment, the timing of notification can be controlled in accordance with the external task of the driver executed in the first traveling mode.

OTHER EMBODIMENTS

In the embodiments described above, an example in which the upper limit speed can be set in three stages has been described. However, the present invention is not limited thereto, and the number of stages may be set to a larger number. Alternatively, the upper limit speed may be set not by a discrete value but by a consecutive value. In this case, for example, a graph indicating a correspondence relationship between the upper limit speed and the timing of notification may be defined, and control may be performed based on this information.

In addition, in the second embodiment described above, the timing of notification is controlled based on the acceleration during the following-up control. As another mode, in a case where the vehicle is traveling alone, the timing of notification may be controlled based on a change in acceleration in accordance with the surrounding situation.

In addition, the control of the timing of notification in each of the embodiments described above is not mutually exclusive, and the control of each of the embodiments may be performed in combination. In addition, even in one traveling mode, different upper limit speeds may be settable in accordance with the traveling situation.

Summary of Embodiments

Embodiment 1

A control system (2, for example) for a vehicle (1, for example) capable of traveling in a first traveling state and a second traveling state, the second traveling state requiring an operation related to traveling by a passenger more than the first traveling state, the control system comprising:
  a change unit (2, for example) configured to change, based on a traveling situation of the vehicle, an upper limit speed at which the vehicle can travel in the first traveling state;
  a notification unit (2, for example) configured to perform notification to the passenger of a request for a predetermined operation at a timing when a traveling speed of the vehicle reaches a predetermined speed when switching from the first traveling state to the second traveling state; and a control unit (2, for example) configured to switch to the second traveling state when detecting the predetermined operation by the passenger, wherein
the notification unit performs control such that a difference between the upper limit speed and the predetermined speed increases in a case where the upper limit speed is high compared to a case where the upper limit speed is low.

According to this embodiment, it is possible to provide vehicle control with high passenger convenience by performing appropriate notification at the time of transition of the traveling state.

Embodiment 2

The control system according to Embodiment 1, further comprising:
a determination unit (2, for example) configured to determine whether or not to perform switching from the first traveling state to the second traveling state based on a traveling situation of the vehicle; and
a vehicle speed control unit (2, for example) configured to control a traveling speed of the vehicle to be brought close to the predetermined speed in a case where the determination unit determines to perform switching to the second traveling state.

According to this embodiment, it is possible to shift to an appropriate traveling speed at the time of transition of the traveling state.

Embodiment 3

The control system according to Embodiment 1, wherein the change unit increases the upper limit speed in at least one of a case where a shape of a road on which the vehicle travels is smaller than a predetermined turning curvature, a case where accuracy of a detection result of a surrounding environment detected by a detection unit included in the vehicle is higher than a threshold, and a case where traveling of the vehicle is stably continued, as the traveling situation of the vehicle.

According to this embodiment, it is possible to travel at a high vehicle speed in a traveling state with a high automation rate in accordance with the traveling situation of the vehicle.

Embodiment 4

The control system according to Embodiment 1, wherein the notification unit increases intensity of the notification in a case where the upper limit speed is high compared to a case where the upper limit speed is low.

According to this embodiment, when the vehicle is traveling at a high vehicle speed, it is possible to prompt the passenger to quickly take over driving at the time of transition of the traveling state.

Embodiment 5

The control system according to Embodiment 1, wherein the notification unit performs control to increase a difference between the upper limit speed and the predetermined speed in a case where a duration of the first traveling state is long compared to a case where the duration is short.

According to this embodiment, even in a case where the passenger has not performed the operation related to the travel control for a long time, it is possible to provide sufficient time in taking over driving, and it is possible to smoothly hand over the operation.

Embodiment 6

The control system according to Embodiment 1, wherein, in the first traveling state, traveling following up a preceding vehicle is performed, and
the notification unit performs control to increase a difference between the upper limit speed and the predetermined speed in a case where an acceleration of the preceding vehicle or the vehicle is high compared to a case where the acceleration is low.

According to this embodiment, even in a case where the travel environment changes due to sudden acceleration of the preceding vehicle that the self-vehicle is following, it is possible to appropriately report to take over driving and smoothly hand over the operation.

Embodiment 7

The control system according to Embodiment 1, further comprising
a detection unit configured to detect an action performed by the passenger of the vehicle, wherein
a difference between the upper limit speed and the predetermined speed is determined in accordance with contents of the action detected by the detection unit.

According to this embodiment, it is possible to smoothly hand over an operation by appropriately taking over driving in accordance with the action being performed by the passenger.

Embodiment 8

The control system according to Embodiment 7, wherein the notification unit performs different notifications in accordance with the contents of the action detected by the detection unit.

According to this embodiment, it is possible to smoothly hand over an operation by making a notification related to taking over driving with appropriate content in accordance with the action being performed by the passenger.

Embodiment 9

A method for controlling a vehicle (1, for example) capable of traveling in a first traveling state and a second traveling state, the second traveling state requiring an operation related to traveling by a passenger more than the first traveling state, the method comprising:
changing, based on a traveling situation of the vehicle, an upper limit speed at which the vehicle can travel in the first traveling state;
performing notification to the passenger of a request for a predetermined operation at a timing when a traveling speed of the vehicle reaches a predetermined speed when switching from the first traveling state to the second traveling state; and
switching to the second traveling state when detecting the predetermined operation by the passenger, wherein
a difference between the upper limit speed and the predetermined speed is increased in a case where the upper limit speed is high compared to a case where the upper limit speed is low.

According to this embodiment, it is possible to provide vehicle control with high passenger convenience by performing appropriate notification at the time of transition of the traveling state.

Embodiment 10

A non-transitory storage medium comprising instructions that, when executed by one or more processors of a vehicle (1, for example) capable of traveling in a first traveling state and a second traveling state, the second traveling state requiring an operation related to traveling by a passenger more than the first traveling state, cause the one or more processors to:
change, based on a traveling situation of the vehicle, an upper limit speed at which the vehicle can travel in the first traveling state;
perform notification to the passenger of a request for a predetermined operation at a timing when a traveling speed of the vehicle reaches a predetermined speed when switching from the first traveling state to the second traveling state; and
switch to the second traveling state when detecting the predetermined operation by the passenger, wherein
a difference between the upper limit speed and the predetermined speed is increased in a case where the upper limit speed is high compared to a case where the upper limit speed is low.

According to this embodiment, it is possible to provide vehicle control with high passenger convenience by performing appropriate notification at the time of transition of the traveling state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control system for a vehicle capable of traveling in a first traveling state and a second traveling state, the second traveling state requiring an operation related to traveling by a passenger more than the first traveling state, the control system comprising:
a change unit configured to change, based on a traveling situation of the vehicle, an upper limit speed at which the vehicle can travel in the first traveling state;
a notification unit configured to perform notification to the passenger of a request for a predetermined operation at a timing when a traveling speed of the vehicle reaches a predetermined speed when switching from the first traveling state to the second traveling state; and
a control unit configured to switch to the second traveling state when detecting the predetermined operation by the passenger, wherein
the predetermined speed at which the notification unit starts the notification is determined based on the upper limit speed changed by the change unit.

2. The control system according to claim 1, wherein the notification unit changes intensity of the notification based on a difference between the upper limit speed and the predetermined speed.

3. The control system according to claim 1, further comprising:
a determination unit configured to determine whether or not to perform switching from the first traveling state to the second traveling state based on a traveling situation of the vehicle; and
a vehicle speed control unit configured to control a traveling speed of the vehicle to be brought close to the predetermined speed in a case where the determination unit determines to perform switching to the second traveling state.

4. The control system according to claim 1, wherein the change unit increases the upper limit speed in at least one of a case where a shape of a road on which the vehicle travels is smaller than a predetermined turning curvature, a case where accuracy of a detection result of a surrounding environment detected by a detection unit included in the vehicle is higher than a threshold, and a case where traveling of the vehicle is stably continued, as the traveling situation of the vehicle.

5. The control system according to claim 1, wherein the notification unit increases intensity of the notification in a case where the upper limit speed is high compared to a case where the upper limit speed is low.

6. The control system according to claim 1, wherein the notification unit performs control to increase a difference between the upper limit speed and the predetermined speed in a case where a duration of the first traveling state is long compared to a case where the duration is short.

7. The control system according to claim 1, wherein,
in the first traveling state, traveling following up a preceding vehicle is performed, and
the notification unit performs control to increase a difference between the upper limit speed and the predetermined speed in a case where an acceleration of the preceding vehicle or the vehicle is high compared to a case where the acceleration is low.

8. The control system according to claim 1, further comprising
a detection unit configured to detect an action performed by the passenger of the vehicle, wherein
a difference between the upper limit speed and the predetermined speed is determined in accordance with contents of the action detected by the detection unit.

9. The control system according to claim 8, wherein the notification unit performs different notifications in accordance with the contents of the action detected by the detection unit.

10. A method for controlling a vehicle capable of traveling in a first traveling state and a second traveling state, the second traveling state requiring an operation related to traveling by a passenger more than the first traveling state, the method comprising:
changing, based on a traveling situation of the vehicle, an upper limit speed at which the vehicle can travel in the first traveling state;
performing notification to the passenger of a request for a predetermined operation at a timing when a traveling speed of the vehicle reaches a predetermined speed when switching from the first traveling state to the second traveling state; and
switching to the second traveling state when detecting the predetermined operation by the passenger, wherein
the predetermined speed at which the notification is started is determined based on the changed upper limit speed.

11. A non-transitory storage medium comprising instructions that, when executed by one or more processors of a vehicle capable of traveling in a first traveling state and a second traveling state, the second traveling state requiring an operation related to traveling by a passenger more than the first traveling state, cause the one or more processors to:
- change, based on a traveling situation of the vehicle, an upper limit speed at which the vehicle can travel in the first traveling state;
- perform notification to the passenger of a request for a predetermined operation at a timing when a traveling speed of the vehicle reaches a predetermined speed when switching from the first traveling state to the second traveling state; and
- switch to the second traveling state when detecting the predetermined operation by the passenger, wherein
- the predetermined speed at which the notification unit starts the notification is determined based on the upper limit speed changed by the change unit.

* * * * *